US012499784B2

(12) United States Patent
Phaneuf et al.

(10) Patent No.: US 12,499,784 B2
(45) Date of Patent: Dec. 16, 2025

(54) LABEL WITH RFID ASSEMBLY

(71) Applicant: CCL EAGILE INCORPORATED, Grand Rapids, MI (US)

(72) Inventors: Peter C. Phaneuf, Grand Rapids, MI (US); Michael Isabell, Grand Rapids, MI (US); Zachary Wagner, Grand Rapids, MI (US)

(73) Assignee: CCL EAGILE INCORPORATED, Grand Rapids, MI (US)

( * ) Notice: Subject to any disclaimer, the term of this patent is extended or adjusted under 35 U.S.C. 154(b) by 0 days.

(21) Appl. No.: 18/254,888

(22) PCT Filed: Nov. 24, 2021

(86) PCT No.: PCT/US2021/060828
§ 371 (c)(1),
(2) Date: May 30, 2023

(87) PCT Pub. No.: WO2022/115607
PCT Pub. Date: Jun. 2, 2022

(65) Prior Publication Data

US 2024/0096240 A1 Mar. 21, 2024

Related U.S. Application Data

(60) Provisional application No. 63/119,409, filed on Nov. 30, 2020.

(51) Int. Cl.
*G09F 3/03* (2006.01)
*G09F 3/10* (2006.01)

(52) U.S. Cl.
CPC .............. *G09F 3/0335* (2013.01); *G09F 3/10* (2013.01)

(58) Field of Classification Search
None
See application file for complete search history.

(56) References Cited

U.S. PATENT DOCUMENTS

| | | | | |
|---|---|---|---|---|
| 6,050,622 | A | 4/2000 | Gustafson | |
| 7,034,689 | B2 * | 4/2006 | Teplitxky ............ | G06K 19/073 343/718 |
| 2003/0117283 | A1 * | 6/2003 | Elworthy .......... | G08B 13/2434 340/572.8 |
| 2005/0242950 | A1 * | 11/2005 | Lindsay ............ | G06K 19/0723 340/572.1 |
| 2007/0139205 | A1 | 6/2007 | Tanaka et al. | |

(Continued)

FOREIGN PATENT DOCUMENTS

| | | |
|---|---|---|
| DE | 102011106275 A1 | 1/2013 |
| EP | 0617826 | 12/1992 |

(Continued)

*Primary Examiner* — Thomas S McCormack
(74) *Attorney, Agent, or Firm* — McDonald Hopkins LLC

(57) ABSTRACT

A radio-frequency identification (RFID) assembly is coupled to or formed with a label for a container. The RFID comprises an for receiving or sending a radio-frequency (RF) signal and a microchip. The microchip, in communication with the antenna, can store or process information and modulate or demodulate information via a radio-frequency (RF) signal. The RFID assembly, including the antenna and the microchip, is formed with or coupled to the label with the microchip disposed at a protected portion of the container.

15 Claims, 10 Drawing Sheets

(56) References Cited

U.S. PATENT DOCUMENTS

| | | | |
|---|---|---|---|
| 2012/0292399 | A1 | 11/2012 | Launiainen |
| 2020/0193260 | A1 | 6/2020 | Forster |

FOREIGN PATENT DOCUMENTS

| | | | |
|---|---|---|---|
| JP | 2006305860 | | 11/2006 |
| JP | 2010091614 | A | 4/2010 |
| JP | 5139226 | | 2/2013 |
| WO | 2008000253 | A1 | 1/2008 |

* cited by examiner

LABEL WITH RFID ASSEMBLY

CROSS-REFERENCE TO RELATED APPLICATIONS

This application is a national stage application of PCT/US2021/060828, filed Nov. 24, 2021, which claims priority to and the benefit of U.S. Provisional Patent Application Nos. 63/119,409, filed Nov. 30, 2020 and U.S. Provisional Patent Application No. 63/162,412, filed Mar. 17, 2021, all of which are incorporated herein by reference in their entireties.

BACKGROUND

A radio frequency identification (RFID) assembly or inlay is an object that can be applied to or incorporated into a product, animal, or person for the purpose of identification or tracking. Most RFID assemblies contain at least two components. The first component is a microchip or integrated circuit that can at least store or process information and modulate or demodulate information via a radio-frequency (RF) signal. The second component is an antenna for receiving or sending the RF signal. An electrical connection exists between the first component and the second component.

BRIEF DESCRIPTION

The invention relocates the microchip and the connection between the microchip and antenna to a protected location. In one aspect, the protected location can be adjacent a neck of the container because the neck of the container has a diameter less than the main body of the container, where the microchip and connection are less susceptible to impact with adjoining containers. In another aspect, the protected location can be a portion of the label that overlaps the microchip and connection between the microchip and the antenna as in an overlap or duplication of a label portion or a pocket where the microchip and connection is less susceptible to impact or damage from impact.

The label design in which the microchip is located adjacent the neck or in an overlapping portion of the label allows for a fully functional antenna footprint on the portion of the label on the high impact surface of the tagged product for a robust antenna. The invention also provides for the needed printing in identifiers, which are critical to unique serialization; all of these elements can be combined in this invention including print and security elements.

DETAILED DESCRIPTION

Figure 1:
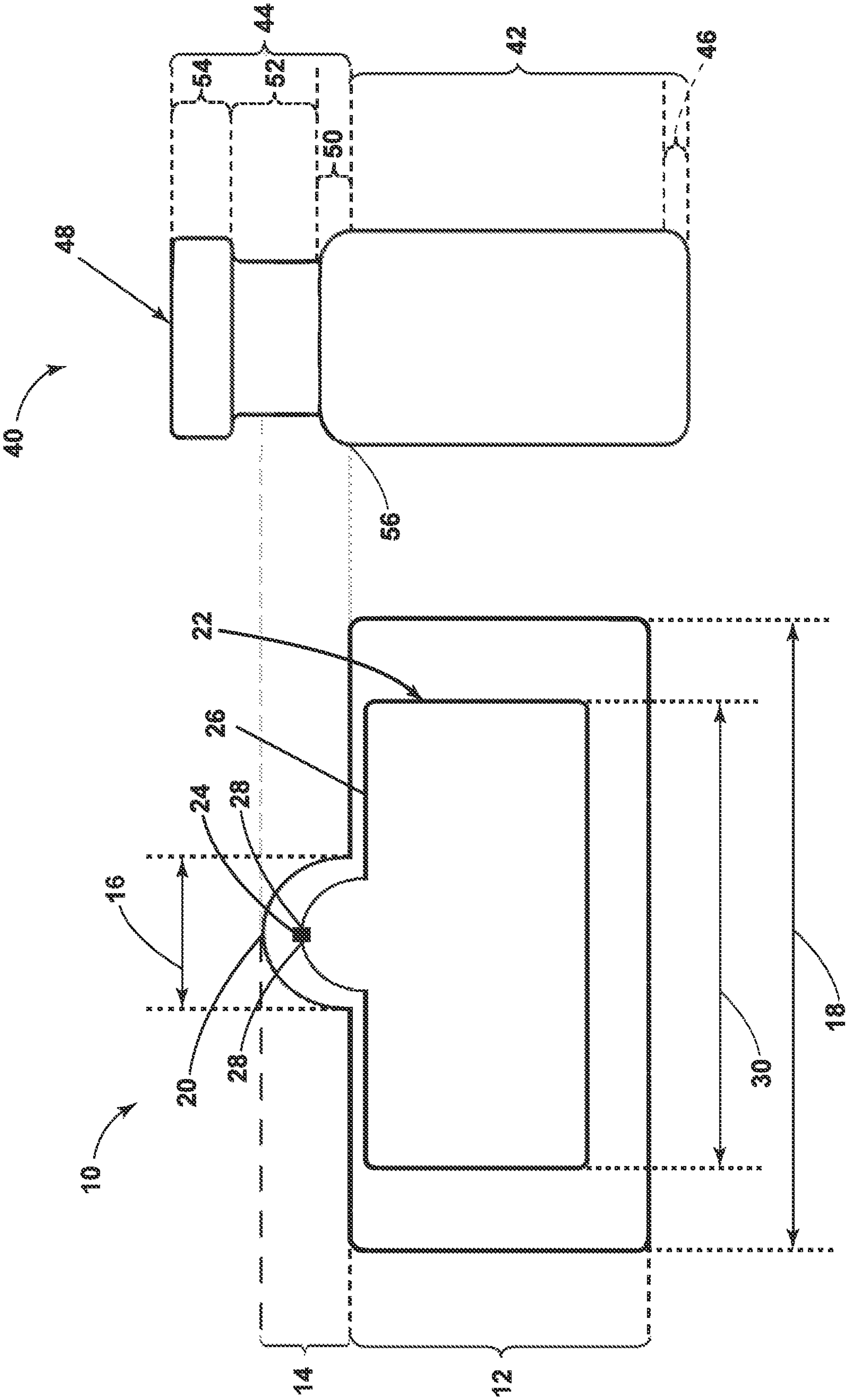
FIG. 1 illustrates a label with a radio frequency identification (RFID) assembly and a container.

Traditionally, a microchip and a fragile connection or junction between the microchip or integrated circuit and an antenna are often located on a container close to or at a location that is likely to come into contact with another surface during transportation of the container. As described herein, the microchip and the connection between the microchip and the antenna are located in a protected location on the container. The protected location on the container can be on a neck of the container where the neck of the container has a diameter less than the main body of the container. Consequently, the microchip and the connection between the microchip and the antenna are less susceptible to impact with adjoining containers. Alternatively, the protected location on the container can be a pocket on the container or a portion of the label in which the label overlaps with itself. The pocket or overlap of the label protects the microchip and connection between the microchip and the antenna from abrasion or damage caused by contact with adjoining containers or other objects.

All directional references (e.g. upper, lower, upward, downward, left, right, lateral, front, back, top, bottom, above, below, vertical, horizontal, etc.) are used only for identification purposes to aid the reader's understanding of the present disclosure, and should not be construed as limiting on an example, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The term "label" as used herein generally relates to a piece of paper, fabric, plastic, or other material attached to an object and can provide information about the object or contents of the object. The term "junction" as used herein generally refers to one or more points where two or more objects are joined or in contact with one another. The term "overlap" as used herein generally refers to one or more portions overlaying another portion enough to cover a microchip and connection beneath or between the overlap.

For example, a label applied to a container can overlap itself by extending around the container a greater distance than the perimeter, causing one portion of the label to overlay another portion of the label. In another example, a first label or layer can at least partially overlay at least a second label or layer, such that at least a portion of the first label or layer overlaps the second label or layer as in a pocket or in multiple layers.

The term "RFID assembly" as used herein refers to a radio frequency identification assembly that includes at least a microchip or integrated circuit that can at least store or process information and modulate or demodulate information via a radio-frequency (RF) signal, an antenna for receiving or sending the RF signal, and a connection or junction between the antenna and the microchip.

FIG. 1 illustrates, by way of example, a rear side or inside of a label 10 having a first portion or main body 12 and a second portion or tab 14. The tab 14 extends from the main body 12. A tab length 16 can be defined by the intersection of the tab 14 and the main body 12. The tab length 16 can be between 2% and 100% of a label length 18, measured as the longest dimension of the main body 12 of the label 10. Alternatively, the tab length 16 can be greater than label length 18.

The tab 14, as illustrated, can be rounded and include a peak 20. Additionally, or alternatively, the tab 14 can includes corners (FIG. 3A-3C) that can be any known shape or combination of shapes, such as, but not limited to, rounder, sharp, or faceted.

An RFID assembly 22 can be coupled to or formed with the label 10. The RFID assembly 22 includes at least an integrated circuit or microchip 24 coupled to an antenna 26 or RF aerial communication device. At least one junction 28 between the microchip 24 and the antenna 26 allows for electrical communication between the microchip 24 and the antenna 26. While illustrated as having two junctions 28, a single microchip 24, and a single antenna 26, other configurations that include one or more integrated circuits, microchips, or antennas are contemplated. The antenna 26 is illustrated as a rectangle, however, it is contemplated that the rectangle is representative of the boundaries of the material that forms the antenna 26, wherein the materials that form the antenna can be formed in any design within the rectangle. It is contemplated that the antenna can be located anywhere, including within the boundaries of the label 10. It is further contemplated that a portion of the antenna can extend beyond the boundaries of the label 10 or be completely outside the label 10.

The label 10 can be made of one or more layers. Each layer can have a different shape, size, or material. It is contemplated that a layer can be formed from or a combination of one or more materials. The RFID assembly 22 can extend past, be formed with, or coupled to one or more of the layers of the label 10. It is further contemplated that the label 10 can be a piggyback label or comprised of a layering of labels.

The microchip 24 can be arranged on or in the tab 14 of the label 10. The at least one junction 28 with the antenna 26 can also be located at the tab 14. As illustrated, by way of non-limiting example, the antenna 26 can extend throughout the main body 12 of the label 10, having any known shape or configuration. It is contemplated that a width 30 of the antenna 26 can be between 2% and 100% of the label length 18. It is further contemplated that the width 30 of the antenna 26 can be between 30% and 100% or between 50% and 100% of the label length 18. Alternatively, the antenna 26 can be located on the tab 14. It will be understood in this and other examples herein that the antenna can be located anywhere on or within the label, anywhere on the container, in a protected location on the container, outside a protected location on the container, or both inside and outside a protected location.

The second portion or tab 14 having the microchip 24 may be located at a protected portion of the container 40. A protected portion of the container in this aspect is any portion of the container 40 that is not subject to direct contact with adjacent containers or objects, or which is at reduced risk of direct contact with adjacent containers or objects than the primary portion 42. For example, a typical container 40 includes a primary portion 42 and a secondary portion or recessed portion 44. Optionally, the container 40 can further include a bottom portion 46 or a removable lid 48. The container 40 is illustrated, by way of example, as a medication vial having a generally cylindrical shape, however any shape container having a primary portion 42 and a recessed portion 44 is contemplated.

The primary portion 42 can include at least the portion of the container 40 with the greatest horizontal cross-sectional area. That is, the primary portion 42 can include the widest or thickest part of the container 40.

The recessed portion 44 includes the portion of the container that extends from or is adjacent to the primary portion 42. The recessed portion 44 often includes a portion of the container 40 in which the horizontal cross-sectional area is less than that of the primary portion 42. Optionally, the recessed portion 44 can include a shoulder 50, a neck 52, or a coupling portion 54. It is contemplated that the lid 48 can couple to the coupling portion 54 by any known means.

The label 10 couples to the container 40 so that the main body 12 of the label 10 is in contact with at least part of the primary portion 42 of the container 40. That is, the main body 12 is sized and dimensioned to be affixed to the side of the container 40. It is contemplated that between 20% and 100% of the main body 12 of the label 10 is coupled to the primary portion 42 of the container 40. The main body 12 of the label 10 can cover between 5% and 100% of the surface area of the primary portion 42 of the container 40. It is contemplated that a portion of the main body 12 of the label 10 can extend from the primary portion 42 of the container 40 to a lower edge 56 of the shoulder 50. Alternatively, the main body 12 can extend past the lower edge 56 of the shoulder 50.

The tab 14 extends from the main body 12 in a position adjacent to the recessed portion 44 of the container 40 which is less subject to impact with other objects such as adjacent containers. As illustrated, by way of non-limiting example, the tab 14 of the label 10 is adjacent the shoulder 50 and part of the neck 52 of the container 40. In other words, the second portion or tab 14 is located on the protected portion of the container 40.

Figure 2:
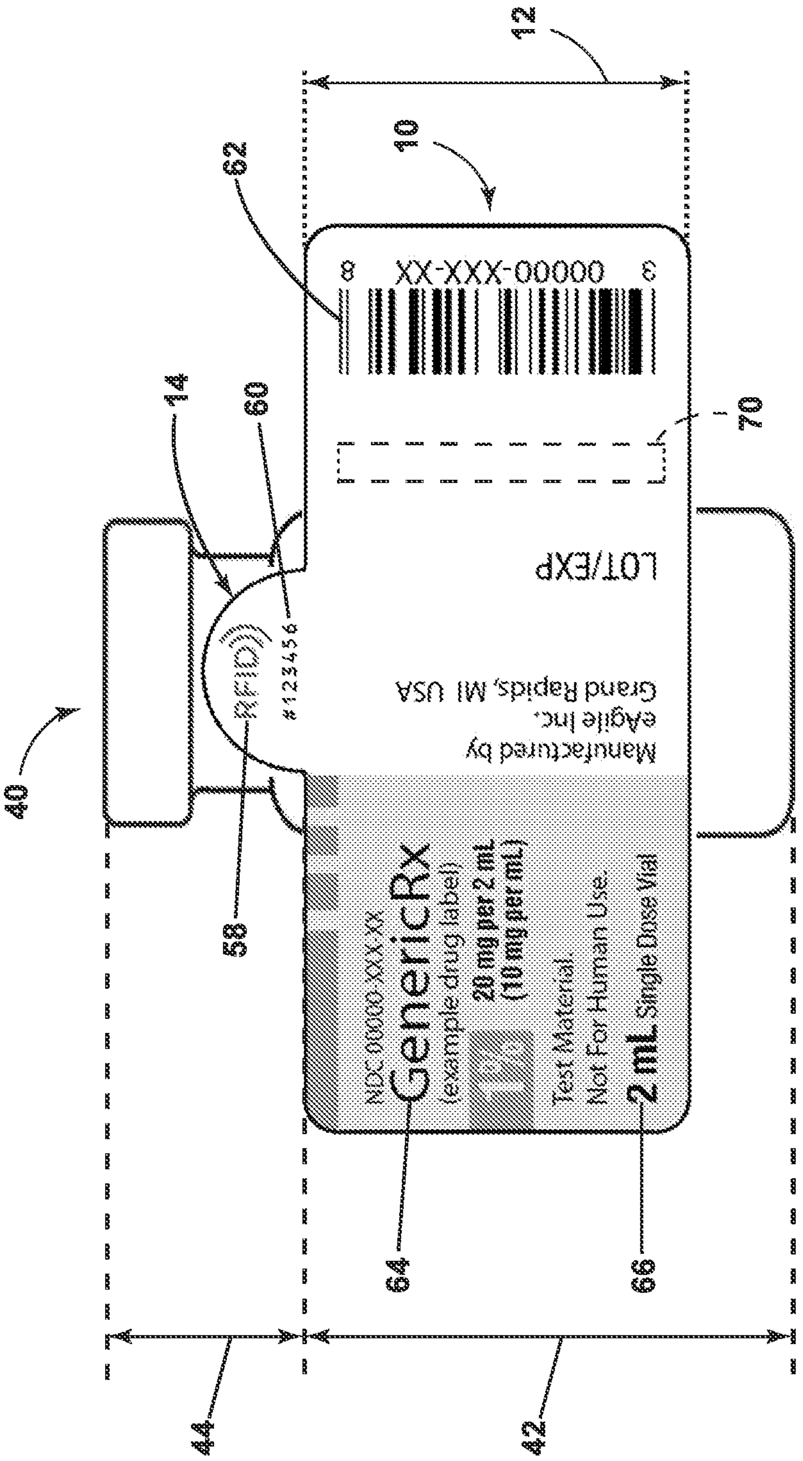
FIG. 2 illustrates the label relative to the container of FIG. 1.

In operation, the container 40 is selected based on desired contents. The label 10 is manufactured, printed, or otherwise obtained based on the container 40 size and contents. FIG. 2 illustrates a front of the label 10 in an aligned position to the container 40. That is, FIG. 2 illustrates how the label 10 aligns with the container 40 just prior to coupling the label 10 to the container 40. The main body 12 of the label 10 is located on the primary portion 42 of the container 40, while the tab 14 of the label 10 extends adjacent the recessed portion 44 of the container 40. The tab 14 can be affixed to at least part of the recessed portion 44 or the tab 14 can project from the main body 12 adjacent to the recessed portion 44 as shown. Alternatively, the tab 14 can be spaced from the recessed portion 44. By way of non-limiting example, the tab 14 can include an RFID identification 58 that indicates that the label 10 includes the RFID assembly 22. The RFID identification 58 can indicate to an observer that a manually applied RFID tag is not required. An RFID detail 60, such as a number, barcode, or other identification, can be included on the tab 14. The RFID detail 60 can provide additional identification, such as, but not limited to, a number indicative of the microchip 24. The RFID detail 60 is not limited to information about the RFID assembly 22, as it is contemplated that there is no limit to what is printed on the label. That is, the RFID detail 60 can be any text, numerical representation, graphic, logo, or combination therein. By way of example, the RFID detail 60 can be shipping information, manufacturing information, or information related to the contents.

Further, the main body 12 of the label 10 can include other features such as, but not limited to, a barcode 62 or other medical information 64 including details of the contents of the container 40 or dosing information 66 as required by regulations.

Optionally, a window 70 can be included in the label 10. The window 70 can be a transparent portion or a cut-out portion of the label 10. The window 70 can be used to observe how much material is in the container 40. While illustrated as rectangle, other regular and irregular polygons and shapes are contemplated for the window 170, such as, but not limited to, an oval, a rounded rectangle, a squircle, a circle, a triangle, a dog bone, an hour glass, or any combination therein.

The label length 18 can be less than the perimeter or circumference of at least one part of the primary portion 42 of the container 40. That is, the label 10 does not overlap as it wraps around the primary portion 42. Alternatively, it is contemplated that the label length 18 can be equal at least one part of the primary portion 42 of the container 40. That is, edges of the label 10 can touch, but do not overlap more than 5% of the label length 18. It is further contemplated that the label length 18 can be greater than the perimeter or circumference of at least one part of the primary portion 42 of the container 40. That is, the edges of the label 10 overlap for 5% or more of the label length 18.

Figures 3A, 3B:
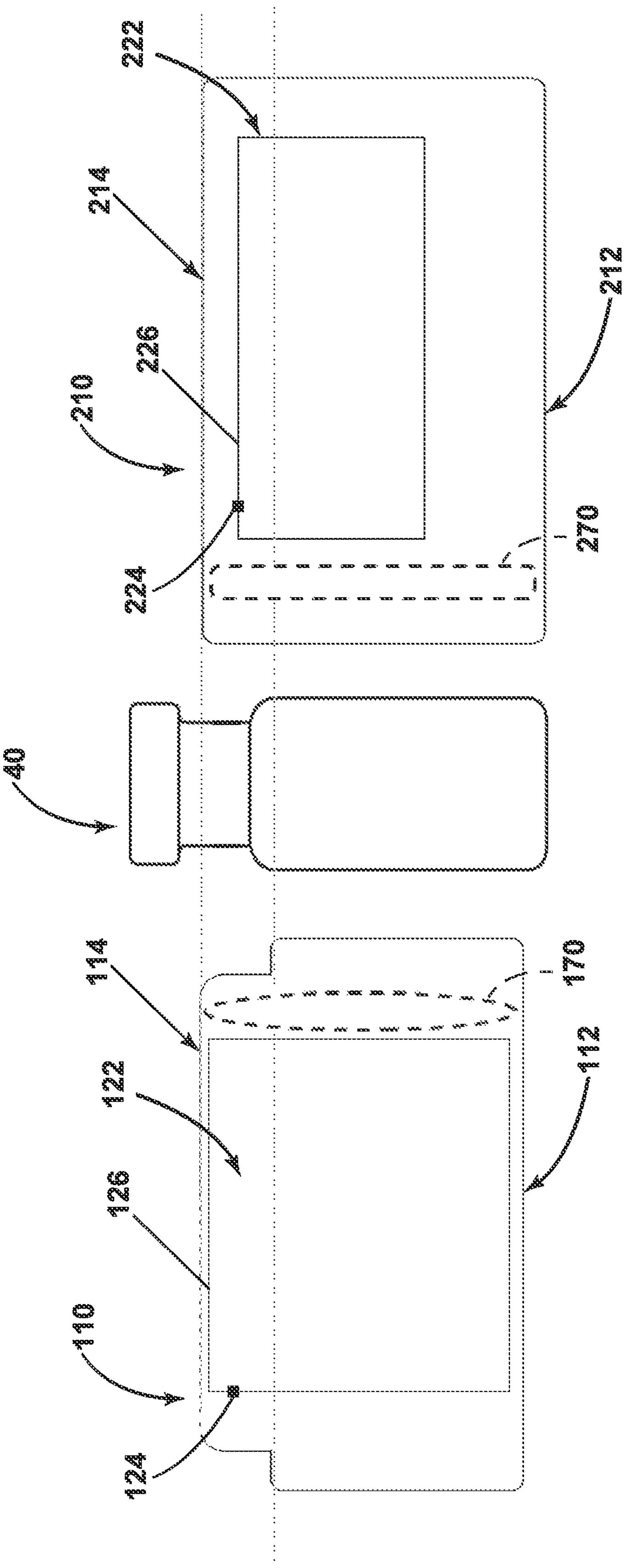
FIG. 3A illustrates a variation of the label and RFID assembly of FIG. 1.
FIG. 3B illustrates another variation of the label and RFID assembly of FIG. 1.

FIG. 3A is a non-limiting example of a label 110 with an RFID assembly 122 shown in relationship to a container 40. The label 110 with the RFID assembly 122 is similar to the label 10 with the RFID assembly 22, therefore, like parts will be identified with like numerals increased by 100, with it being understood that the description of the like parts of the label 10 applies to the label 110 unless otherwise noted.

The label 110 includes a main body 112 and tab 114. By way of non-limiting example, the label 110 includes the RFID assembly 122. The RFID assembly 122 includes a microchip 124 and an antenna 126. The microchip 124 and a portion of the antenna 126 are located on the tab 114, disposed to be located on the neck of the container 40, i.e., the protected portion of the container 40. By way of example, the microchip 124 is located on a side portion of the overall shape of the antenna 126. That is, the antenna 126 can extend above the microchip 124 on the tab 114.

Optionally, the label 110 can include a window 170. While illustrated as an oval, other regular and irregular polyons and shapes are contemplated for the window 170, such as, but not limited to, a rectangle, a rounded rectangle, a squircle, a circle, a triangle, a dog bone, an hour glass, or any combination therein.

FIG. 3B is a non-limiting example of a label 210. The label 210 is similar to the label 10, 110 therefore, like parts will be identified with like numerals increased by 100, with it being understood that the description of the like parts of the label 10, 110 applies to the label 210 unless otherwise noted.

The label 210 includes a main body 212 and tab 214. By way of non-limiting example, the label 210 includes the RFID assembly 222. The RFID assembly 222 includes a microchip 224 and an antenna 226. By way of example, the outside edge of the antenna 226 generally forms a rectangular shape. Optionally, the label 210 can include a window 270. While illustrated as a rounded rectangle, other regular and irregular polygons and shapes are contemplated for the window 270, such as, but not limited to, a rectangle, an oval, a squircle, a circle, a triangle, a dog bone, an hour glass, or any combination therein. In this example, the microchip 224 is disposed to be located on the neck of the container 40, i.e., the protected portion of the container 40.

Figures 3C, 3D:
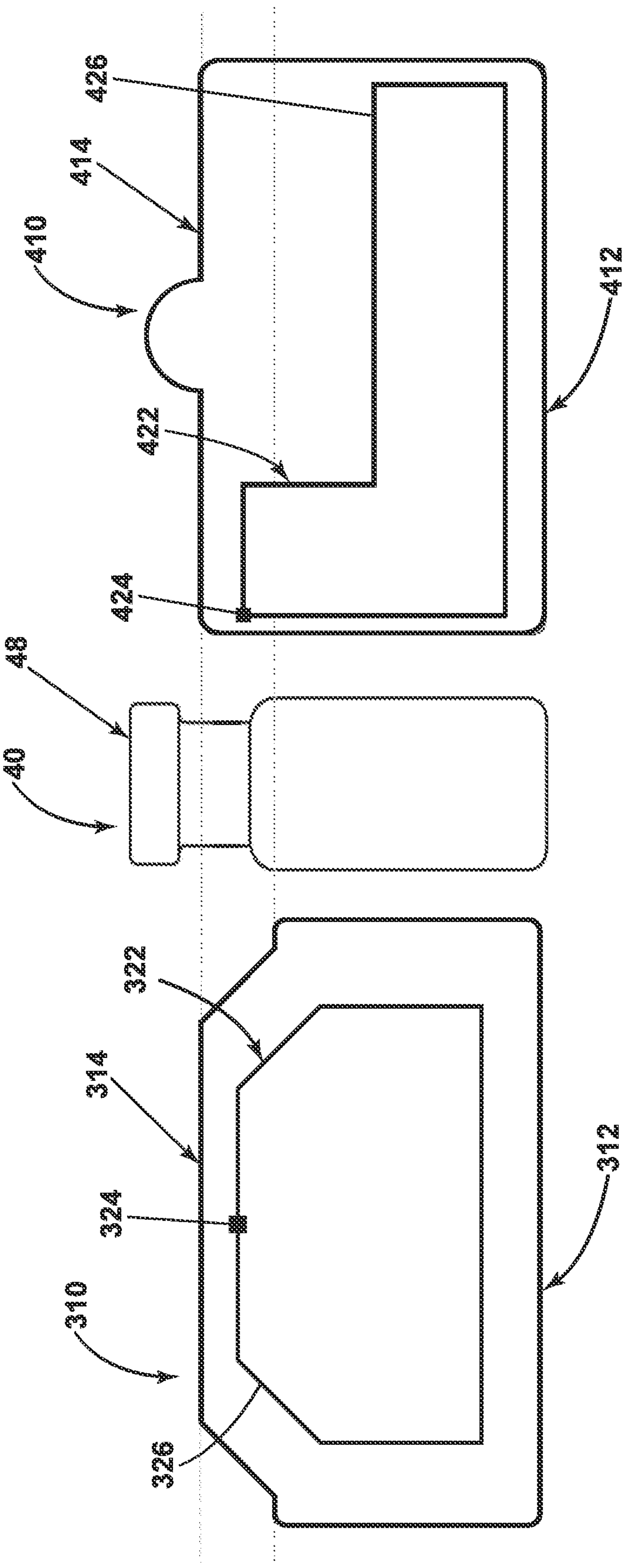
FIG. 3C illustrates still another variation of the label and RFID assembly of FIG. 1.
FIG. 3D illustrates yet still another variation of the label and RFID assembly of FIG. 1.

FIG. 3C is a non-limiting example of a label 310. The label 310 is similar to the label 10, 110, 210 therefore, like parts will be identified with like numerals increased by 100, with it being understood that the description of the like parts of the label 10, 110, 210 applies to the label 310 unless otherwise noted.

The label 310 includes a main body 312 and tab 314. By way of non-limiting example, the label 310 includes the RFID assembly 322. The RFID assembly 322 includes a microchip 324 and an antenna 326. By way of example, the outside edge of the antenna 326 forms a hexagon. In this example, the microchip 324 is disposed to be located on the neck of the container 40, i.e., the protected portion of the container 40.

FIG. 3D is a non-limiting example of a label 410. The label 410 is similar to the label 10, 110, 210, 310 therefore, like parts will be identified with like numerals increased by 100, with it being understood that the description of the like parts of the label 10, 110, 210, 310 applies to the label 410 unless otherwise noted.

The label 410 includes a main body 412 and tab 414. The tab 414 extend from the main body 412 to at least a portion of a lid 48. By way of non-limiting example, the label 410 includes the RFID assembly 422. The RFID assembly 422 includes a microchip 424 and an antenna 426. By way of example, the outside edge of the antenna 426 forms an L-shape. In this example, the microchip 424 is disposed to be located on the neck of the container 40, i.e., the protected portion of the container 40.

All combinations of the labels 10, 110, 210, 310, 410 illustrated herein and the RFID assemblies 22, 122, 222, 322, 422 are contemplated. Additionally, other label shapes and electrical configurations for the RFID assembly 22, 122, 222, 322, 422 are further considered.

Figure 4:
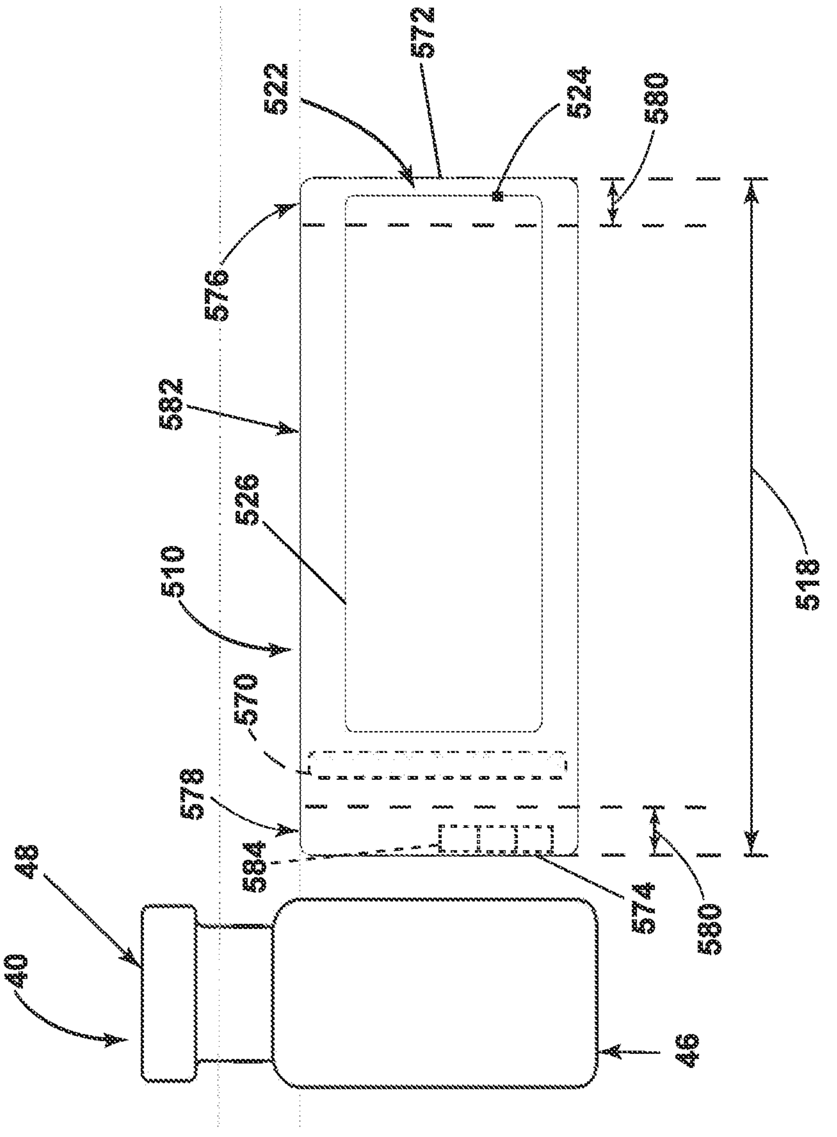
FIG. 4 illustrates a back view of a label with an RFID assembly and the container.

FIG. 4 is a non-limiting example of a rear view of a label 510. The label 510 is similar to the label 10, 110, 210, 310, 410 therefore, like parts will be identified with like numerals increased by 100, with it being understood that the description of the like parts of the label 10, 110, 210, 310, 410 applies to the label 510 unless otherwise noted.

The label 510 has a label length 518 that is greater than the perimeter or circumference of at least a portion of the container 40. That is, when the label 510 is applied to the container 40, a first edge 572 of the label 510 overlaps a second edge 574 of the label 510. The label length 518 is defined as the longest dimension of the label 510 measured in a plane parallel to the lid 48 or the bottom 46 of the container 40 when the label 510 is applied to the container 40. A first overlap portion 576 adjacent the first edge 572 and a second overlap portion 578 adjacent the second edge 574 can be defined as the portions of the label 510 that overlap.

The first overlap portion 576 and the second overlap portion 578 can have an overlap length 580. The overlap length 580 can be 50% or less of the label length 518. However, it is contemplated that the overlap length 580 is less than or equal to 20% of the label length 518. It is further contemplated that the overlap length 580 can be 10% or less of the label length 518. Alternatively, the overlap length 580 can be greater than 50% of the label length 518. It is further contemplated that the label 510 can overlap itself several times. That is, by way of example, the overlap length 580 can be between 100% and 1000%. In any embodiment, the overlap must be enough to cover the microchip and its connection to the antenna; the antenna need not be covered by the overlap.

An RFID assembly 522 can be coupled to or formed with the label 510. The RFID assembly 522 includes at least an integrated circuit or microchip 524 coupled to an antenna 526 or RF aerial communication device. As illustrated by way of non-limiting example, the microchip 524 can be located on or in the first overlap portion 576 of the label 510. That is, when the label 510 is applied to the container 40, the microchip 524 is between the first overlap portion 576 and the second overlap portion 578. Alternatively, the microchip 524 can be located on or in the second overlap portion 578 of the label 510. That is, when the label 510 is applied to the container 40, the microchip 524 is beneath the first and second overlap portions 576, 578. When located at the second overlap portion 578, the microchip 524 can be between the second overlap portion 578 and the container 40. The multiple layers formed by the first and second overlap portions 576, 578 provide insulation, cushioning, padding, lining, isolation, or other form of protection for the microchip 524. That is, the first and second overlap portions 576, 578 form a protected location for the microchip 524, i.e., a protected portion of the container 40 when the label 510 is applied to the container 40.

It is contemplated that the overlap length 580 can be determined by the location of the microchip 524. That is, the overlap length 580 can be the length required for at least a portion of the microchip 524 to be radially adjacent to or in contact with the first and second overlapping portions 576, 578. In other words, the location of the microchip 524 is not limited to being adjacent the sides of the label 510, as the size of the first and second overlapping portions 576, 578 can be adjusted so that at least a portion of the microchip 524 is radially adjacent to or in contact with the first and second overlapping portions 576, 578.

It is further contemplated that the microchip 524 can be embedded in the first or second overlapping portions 576, 578. For example, if the microchip 524 is embedded in the first overlapping portion 576, when applied to the container, the second overlapping portion 578 will overlap the microchip 524, but not directly contact the microchip 524.

Optionally, the first overlap portion 576 or the second overlap portion 578 can include material 584 or an additional layer such that, when the label 510 is applied to the container 40, the microchip 524 is surrounded by the material 584. The material 584 can be added to the front, middle, or rear of the label 510. As illustrated, by way of non-limiting example, the material 584 is mounted to the front of the second overlap portion 578. When the label 510 is applied to the container 40, the material 584 surrounds the microchip 524 that is illustrated as mounted to the first overlapping portion 576. It is further contemplated that in addition or as an alternative, material can also be added to the first overlap potion 576.

Additionally, or alternatively, material can be removed from the first overlap portion 576 or the second overlap portion 578 at the location of the microchip 524 before, as, or after the label 510 is applied to the container 40. The removal of the material can form a pocket or recess at the location of the microchip 524, i.e., a protected portion of the container 40 when the label 510 is applied to the container 40.

As illustrated, by way of non-limiting example, the antenna 526 can extend from the first overlap portion 576 throughout a main body of the label 510, having any known shape or configuration. Alternatively, the antenna 526 can extend from the second overlap portion 578 throughout the label 510. It is contemplated that the antenna 526 can be located in both the first or second overlap portions 576, 578. It is further contemplated that the antenna 526 can be located entirely on the first overlap portion 576 or the second overlap portion 578.

Figure 5:
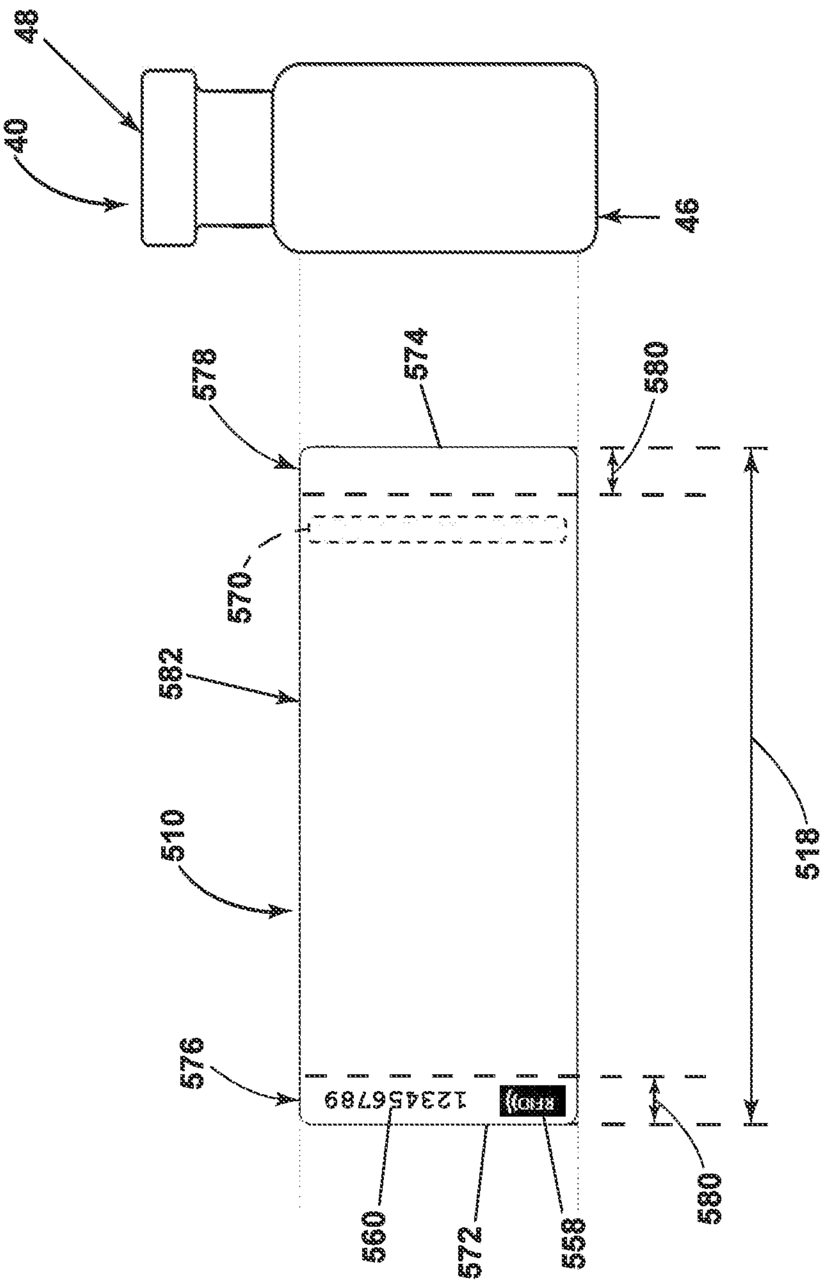
FIG. 5 illustrates a front view of the label with the RFID assembly of FIG. 4.

FIG. 5 is a non-limiting example of a front view of an RFID label 510. The label 510 can include an RFID mark 558 that indicates that the label 510 includes the RFID assembly 522. While illustrated in the first overlap portion 576, the RFID mark 558 can be located in the second overlap portion 578. That is, the first overlap portion 576 or the second overlap portion 578 can be applied as the leading edge, wherein the RFID mark 558 can be located on the first overlap portion 576 or the second overlap portion 578, such that when applied, the RFID mark 558 is visible. The RFID mark 558 can indicate to an observer that a manually applied RFID tag is not required.

An RFID identification 560, such as a number, barcode, or other identification, can be included on the label 510. The RFID identification 560 can provide information, such as, but not limited to, a number indicative of the microchip 524, a recipient of the container 40, information related to the contents of the container 40, the dosing of the contents of the container 40, one or more manufacturers of the contents of the container 40, storage information, or shipping information. The RFID identification 560 can be any text, numerical representation, graphic, logo, or combination therein. Optionally, the RFID mark 558 or the RFID identification 560 can overlap at least a portion of the microchip 524 when the label 510 is applied to the container 40.

Optionally, the label 510 can include a window 570. The window 570 can allow a user to look at the contents of the container 40.

Figure 6B:
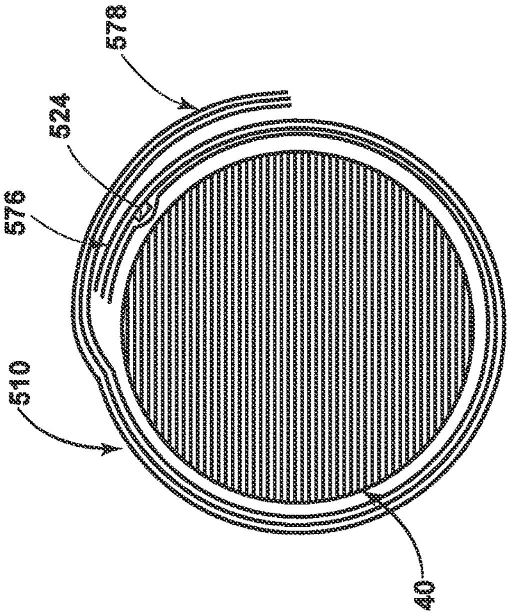
FIG. 6B is a variation of the schematic cross section of the label and RFID assembly from FIG. 6A.
Figure 6C:
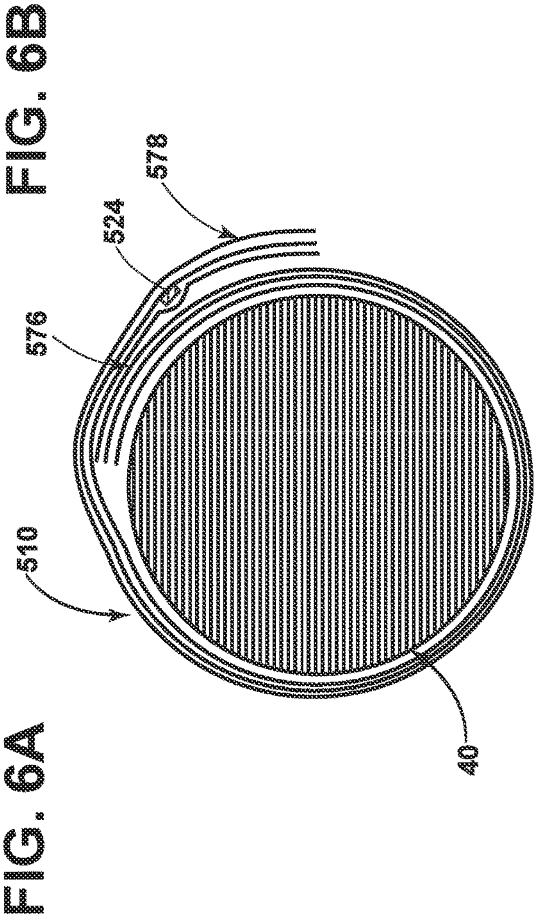
FIG. 6C is another variation of the schematic cross section of the label and RFID assembly from FIG. 6A.
Figure 6A:
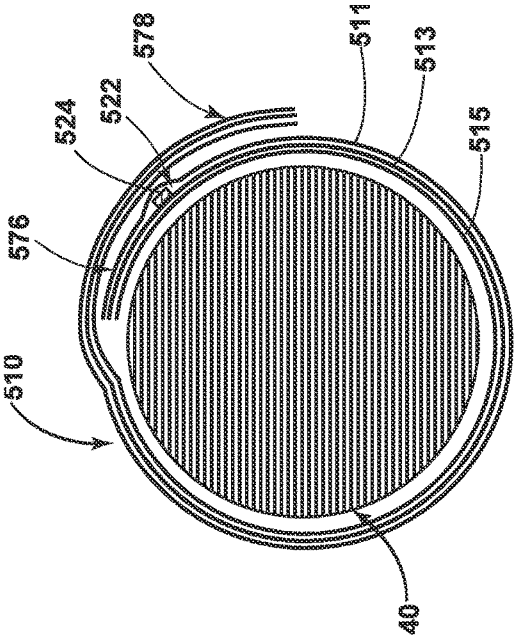
FIG. 6A is a schematic cross section of the label and RFID assembly from FIG. 4 and FIG. 5 when applied to a container.

FIG. 6A further illustrates the label 510 when applied to the container 40. The microchip 524 is mounted or otherwise coupled to the first overlap portion 576. As illustrated, by way of example, the microchip 524 is between the first overlap portion 576 and the second overlap portion 578 when the label 510 is applied to the container 40.

While any number of labels or layers are contemplated, the label 510 is illustrated, by way of example, as having a first layer 511, a second layer 513, and a third layer 515. The first layer 511 can be an outer layer on which information is printed. The second layer 513 can be or include at least part of the RFID assembly 522. The third layer 515 can be an inner layer that can include, but is not limited to, insulating material or adhesive. The first, second, and third layers 511, 513, 515 can be coupled together prior to application of the label 510 to the container 40. Alternatively, one or more of the first, second, or third layers 511, 513, 515 can be applied to the container 40 or a portion of the container 40 during application of the label 510 to the container 40. The first layer 511, second layer 513, or the third layer 515 can include a recess that receives the microchip 524.

FIG. 6B is a variation of the location of the microchip 524. As illustrated, by way of example, the microchip 524 can be mounted to the first overlap portion 576, such that when the label 510 is applied to the container 40, the microchip 524 is between the first overlap portion 576 and the container 40. The second overlap portion 578 couples to or connects with the first overlap potion 576.

FIG. 6C is another variation of the location of the microchip 524. As illustrated, by way of example, the microchip 524 can be mounted to the second overlap portion 578, such that when the label 510 is applied to the container 40, the microchip 524 is between the first overlap portion 576 and the second overlap portion 578.

Figures 7A, 7B:
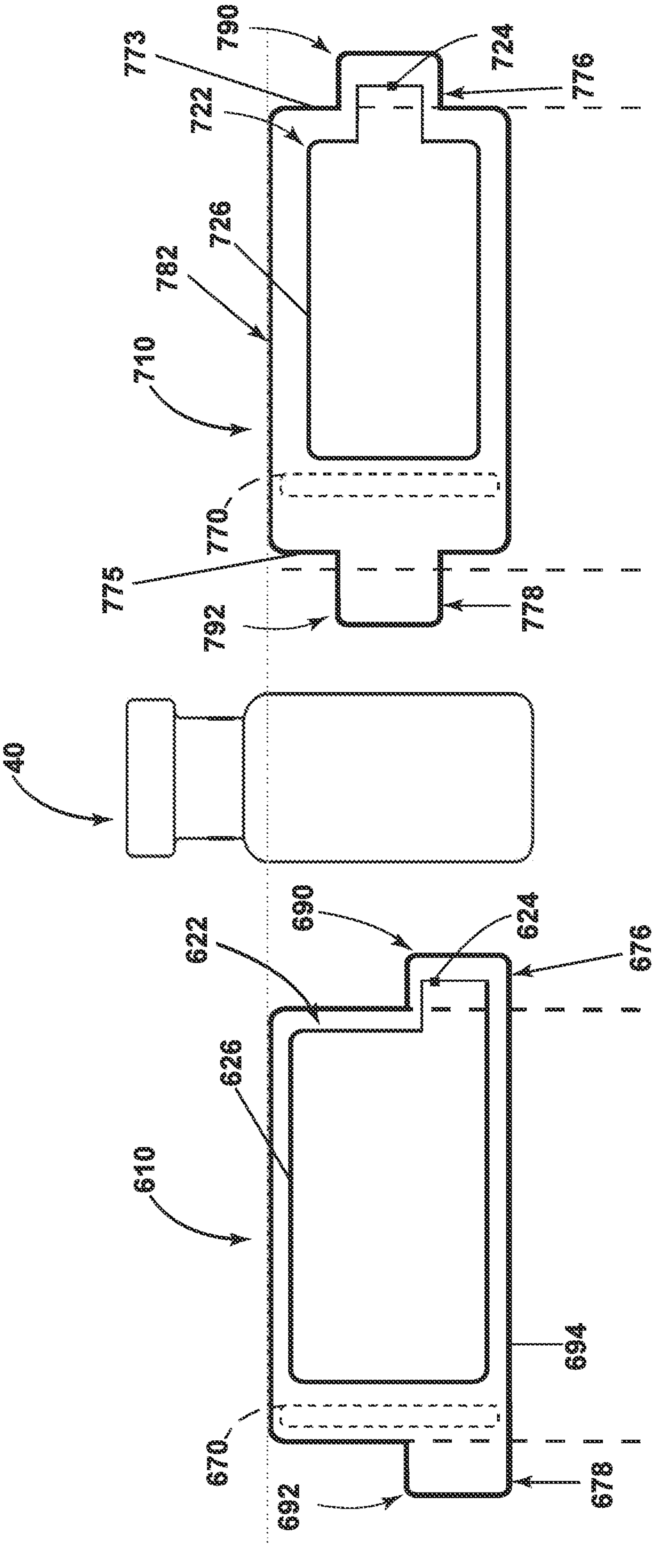
FIG. 7A illustrates a variation of the label and RFID assembly of FIG. 4.
FIG. 7B illustrates another variation of the label and RFID assembly of FIG. 4.

FIG. 7A is a non-limiting example of a label 610. The label 610 is similar to the label 10, 110, 210, 310, 410, 510 therefore, like parts will be identified with like numerals increased by 100, with it being understood that the description of the like parts of the label 10, 110, 210, 310, 410, 510 applies to the label 610 unless otherwise noted.

The label 610 includes a first portion 690, a second portion 692, and an RFID assembly 622. A first overlap portion 676 can defined by at least part of the first portion 690. A second overlap portion 678 can be defined by at least part of the second portion 692. The first and second portions 690, 692 are illustrated, by way of example, as having the same dimensions where the first and second portion 690, 692 are aligned with a lower portion 694 of the label 610. It is contemplated that that the first portion 690 and the second portion 692 can have different dimensions, shapes, or vertical location such that at least a part of the first portion 690 overlaps part or all of the second portion 692.

The RFID assembly 622 includes a microchip 624 and an antenna 626. The microchip 624, by way of example can be located on the first overlap portion 676, forming a protected portion of the container 40 when the label 610 is attached to the container 40. Alternatively, the microchip 624 can be located on the second overlap portion 678, forming a protected portion of the container 40 when the label 610 is attached to the container 40. Optionally, the label 610 can further include a window 670.

FIG. 7B is a non-limiting example of a label 710. The label 710 is similar to the label 10, 110, 210, 310, 410, 510, 610 therefore, like parts will be identified with like numerals increased by 100, with it being understood that the description of the like parts of the label 10, 110, 210, 310, 410, 510, 610 applies to the label 710 unless otherwise noted.

The label 710 includes a first portion or first protrusion 790, a second portion or second protrusion 792, and an RFID assembly 722. As illustrated, by way of example, a first overlap portion 776 is defined by the first protrusion 790. A second overlap portion 778 is defined by a portion of the second protrusion 792. The second protrusion 792 can extend farther than the first protrusion 790 from a non-overlapping portion 782. The first and second protrusions 790, 792 are centered vertically on the label 710. It is contemplated that that the first protrusion 790 and the second protrusion 792 can have similar or different dimensions, shapes, or vertical location such that at least a part of the first protrusion 790 overlaps part of the second protrusion 792.

The RFID assembly 722 includes a microchip 724 and an antenna 726. The microchip 724, by way of example can be located at the first protrusion 790 or the first overlap portion 776, forming a protected portion of the container 40 when the label 710 is attached to the container 40. Alternatively, the microchip 724 can be located at the second protrusion 792 in the second overlap portion 778, forming a protected portion of the container 40 when the label 710 is attached to the container 40.

Optionally, the label 710 can further include a window 770. Additionally, or alternatively, one or more windows can be formed by the space between a first edge 773 and a second edge 775 of the label 710, when the label 710 is applied to the container 40. That is, a potion of the container 40 can be visible between the first edge 773 and second edge 775 when the label 710 is applied to the container 40.

Figure 7D:
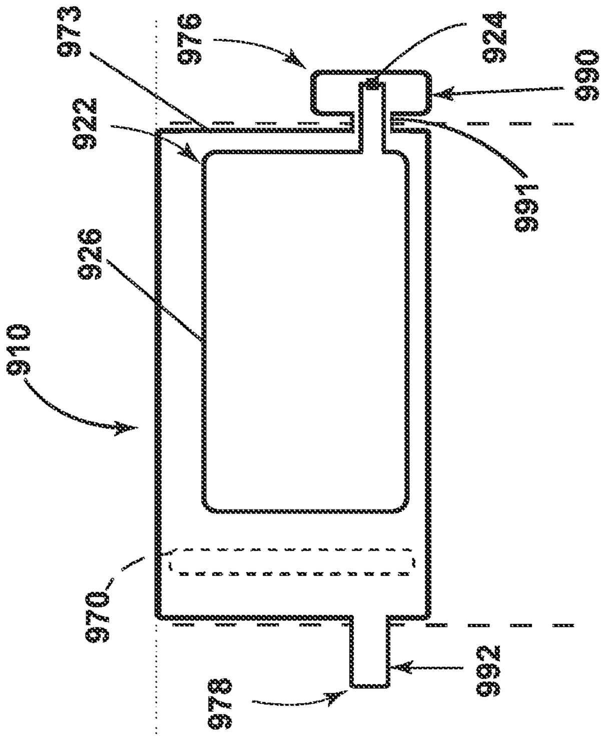
FIG. 7D illustrates still yet another variation of the label and RFID assembly of FIG. 4.
Figure 7C:
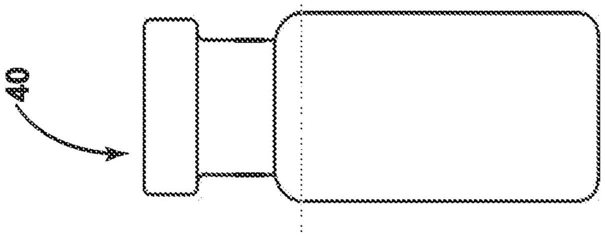
FIG. 7C illustrates yet another variation of the label and RFID assembly of FIG. 4.
Figure 7C:
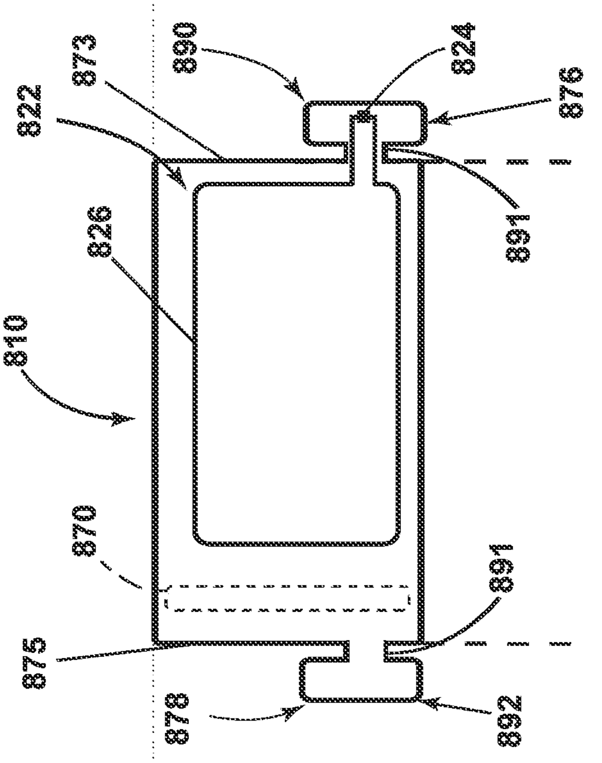

FIG. 7C is a non-limiting example of a label 810. The label 810 is similar to the label 10, 110, 210, 310, 410, 510, 610, 710 therefore, like parts will be identified with like numerals increased by 100, with it being understood that the description of the like parts of the label 10, 110, 210, 310, 410, 510, 610, 710 applies to the label 810 unless otherwise noted.

The label 810 includes a first portion or first tag 890, a second portion or second tag 892, and an RFID assembly 822. The first portion 890 and the second portion 892 can include a narrowed coupling portion 891 that couples the first portion 890 to a first edge 873 and the second portion 892 to a second edge 875. A first overlap portion 876 can defined by at least part of the first portion 890. A second overlap portion 878 can be defined by at least part of the second portion 892. The first and second portions 890, 892 are illustrated, by way of example, as having the same dimensions. However, it is contemplated that that the first portions 890 and the second portions 892 can have different dimensions, shapes, or vertical location such that at least a part of the first tag 890 overlaps part or all of the second tag 892.

The RFID assembly 822 includes a microchip 824 and an antenna 826. The microchip 824, by way of example can be located on the first overlap portion 876, forming a protected portion of the container 40 when the label 810 is attached to the container 40. Alternatively, the microchip 824 can be located on the second overlap portion 878, forming a protected portion of the container 40 when the label 810 is attached to the container 40.

The first portion 890 or the second portion 892 can provide a surface area for the microchip 824 or printed information, such an RFID mark or identification as discussed above. The narrowed coupling portion 891 can be narrowed to allow for a viewing window or region between the first edge 873 and the second edge 875. Optionally, the label 810 can include a window 870.

FIG. 7D is a non-limiting example of a label 910. The label 910 is similar to the label 10, 110, 210, 310, 410, 510, 610, 710, 810 therefore, like parts will be identified with like numerals increased by 100, with it being understood that the description of the like parts of the label 10, 110, 210, 310, 410, 510, 610, 710, 810 applies to the label 910 unless otherwise noted.

The label 910 includes a first portion or first tag 990, a second portion or second tag 992, and an RFID assembly 922. The first portion 990 includes a narrowed coupling portion 991 that couples the first portion 990 to a first edge 973. The second portion 992, can be a different design than the first portion 990. By way of non-limiting example, the surface area of the second portion 992 is less than the first portion 990. However, it is contemplated that the surface area of the second portion 992 can be greater than or equal to the surface area of the first portion 990. It is contemplated that that the first portion 990 and the second portion 992 can have different dimensions, shapes, or vertical location such that at least a part of the first tag 990 overlaps part or all of the second tag 992.

A first overlap portion 976 can defined by at least part of the first portion 990. A second overlap portion 978 can be defined by at least part of the second portion 992.

The RFID assembly 922 includes a microchip 924 and an antenna 926. The microchip 924, by way of example can be located on the first overlap portion 976, forming a protected portion of the container 40 when the label 910 is attached to the container 40. Alternatively, the microchip 924 can be located on the second overlap portion 978, forming a protected portion of the container 40 when the label 910 is attached to the container 40. Optionally, the label 910 can include a window 970.

Figure 7E:
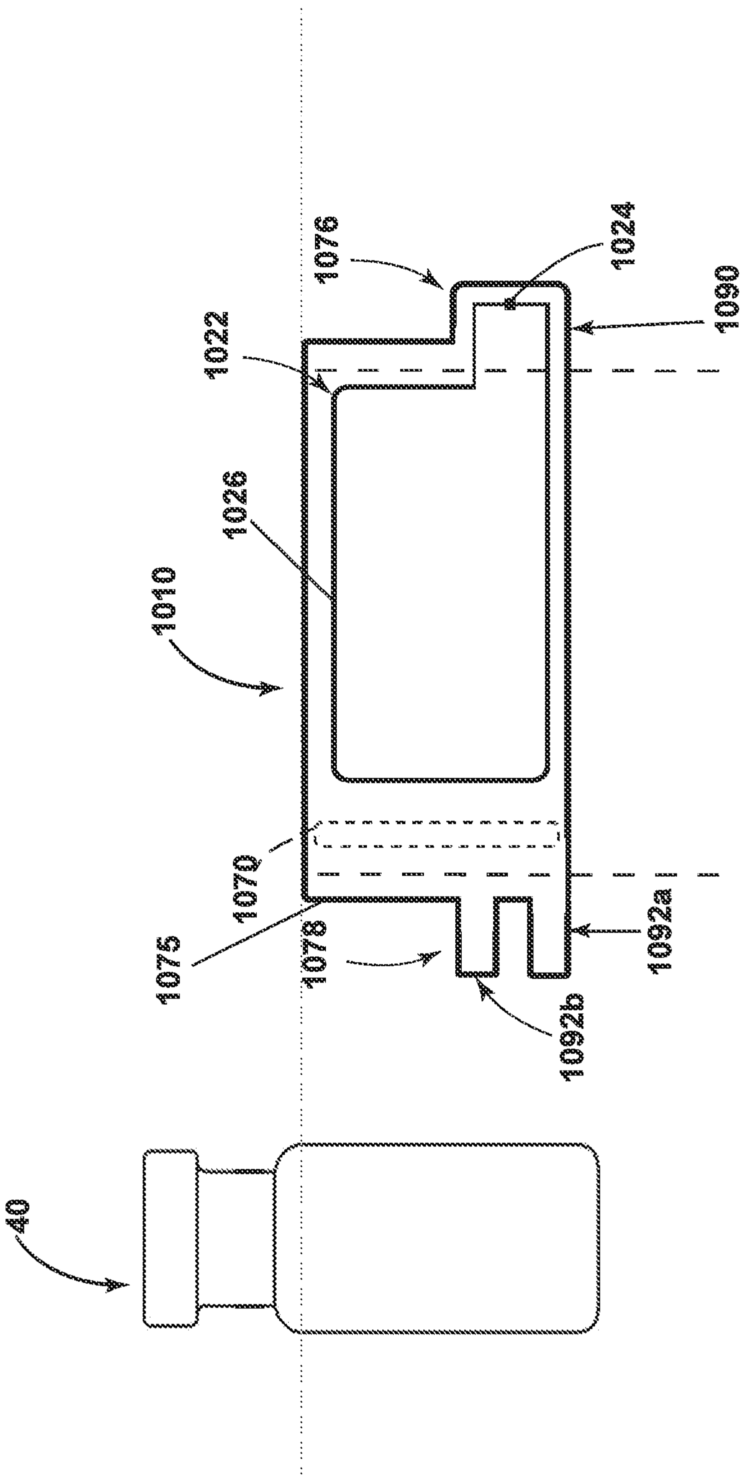
FIG. 7E illustrates another variation of the label and RFID assembly of FIG. 4.

FIG. 7E is a non-limiting example of a label 1010. The label 1010 is similar to the label 10, 110, 210, 310, 410, 510, 610, 710, 810, 910 therefore, like parts will be identified with like numerals increased by 100, with it being understood that the description of the like parts of the label 10, 110, 210, 310, 410, 510, 610, 710, 810, 910 applies to the label 1010 unless otherwise noted.

The label 1010 includes a first portion 1090, a second portion 1092, and an RFID assembly 1022. The second portion 1092 is a set of protrusions 1092*a*, 1092*b* that extend from a second edge 1075. While illustrated as having two protrusions, the set of protrusions 1092*a*, 1092*b* can include any number of protrusions.

By way of non-limiting example, the surface area of the set of protrusions 1092*a*, 1092*b* is less than the first tag 1090. It is contemplated that the surface area of the set of protrusions 1092*a*, 1092*b* can be greater than or equal to the surface area of the first portion 1090. It is contemplated that that the first portion 1090 and the second portion 1092 can have different dimensions, shapes, or vertical location such that at least a part of the first portion 1090 overlaps part or all of the set of protrusions 1092*a*, 1092*b*.

A first overlap portion 1076 can defined by at least part of the first portion 1090. A second overlap portion 1078 can be defined by the set of protrusions 1092*a*, 1092*b*.

The RFID assembly 1022 includes a microchip 1024 and an antenna 1026. The microchip 1024, by way of example, can be located on the first portion 1090 so that when the label 1010 is applied to the container 40, the microchip 1024 is between the set of protrusions 1092*a*, 1092*b*, forming a protected portion of the container 40. That is, when the label 1010 is applied to the container 40, the microchip 1024 is located between the first portion 1090 and the container 40, wherein the set of protrusions 1092*a*, 1092*b* forms a recess that receives the microchip 1024, i.e., a protected portion of the container 40.

Alternatively, the microchip 1024 can be located on the second overlap portion 1078 or one of the set of protrusions 1092*a*, 1092*b*, forming a protected portion of the container 40. Optionally, the label 1010 can include a window 1070.

All combinations of aspects of the labels 10, 110, 210, 310, 410, 510, 610, 710, 810, 910, 1010 illustrated herein and the RFID assemblies 22, 122, 222, 322, 422, 522, 622, 722, 822, 922, 1022 are contemplated. Additionally, other label shapes and electrical configurations for the RFID assembly are further considered.

Benefits associated with aspects of the disclosure herein relate to manufacturing, handling, storing, shipping or transporting the container. The primary portion of the container is more likely to come into contact with other containers or surfaces. The protected portion of the container is in one aspect less likely to come into contact with other containers or objects. During shipping or transportation, the container can be subject to impact with other objects such as adjacent containers. Having the at least one junction located at the protected portion of the container will decrease the chance of impact to the at least one junction. Similarly, if the microchip is located at the protected portion, the chance of impact to the microchip also decreases. The protected portion of the container is in another aspect able to provide insulation, cushioning, padding, lining, isolation, or other forms of protection if contact does occur between the container and adjacent containers or objects, making damage to the microchip or junction less likely.

Another benefit from having the RFID microchip at a portion such as a tab for example, is that the antenna can be larger. With the RFID microchip on a tab, the antenna size can be maximized to cover the entire main body of the label. Further, labels can still be applied by label compression rollers, for example, as these devices engage the main body of the label while fixing the label to the container. While the application devices engage with the main body of the label, they do not engage with the tab. Having the RFID microchip and the at least one junction on the tab provides more protection to these devices during the label application process.

Yet another benefit of the aspects of the disclosure include a quick implementation of the label disclosed herein into already existing packaging systems. The main body and tab of the label provide a similar structure to the traditional label applied to the container. Therefore, little, if any, modifications of the process of applying the label are required. That is, having the tab include the RFID specific information, the rest of the label printing can remain essentially the same. This is important to swift regulatory approvals as changes to the labeling must also be approved by regulatory agencies. It is preferable to minimize differences between the thickness of an existing non-RFID label and the thickness of the label having the RFID assembly as disclosed in order to minimize modifications to existing equipment such as: label applicators, production line guard rails/carriers and robotics. By utilizing aspects of the disclosure, existing medication product packaging (trays, cases cartons) would not require modifications.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses, the subject matter of which can be combined in any combination or permutation with one or more other clauses described herein:

a. A radio-frequency identification (RFID) assembly coupled to or formed with a label for a container, wherein RFID assembly comprises an antenna for receiving or sending a radio-frequency (RF) signal, the antenna substantially located on or within a main body of the label; a microchip for storing or processing information, a junction between the microchip and the antenna wherein the microchip is in electrical communication with the antenna, and wherein the microchip and the junction are at a protected portion of the container.

b. A radio-frequency identification (RFID) assembly coupled to or formed with a label for a container, wherein RFID assembly comprises an antenna for receiving or sending a radio-frequency (RF) signal, the antenna substantially located on or within a main body of the label; a microchip for storing or processing information, a junction between the microchip and the antenna wherein the microchip is in electrical communication with the antenna, wherein the microchip and the junction are at a protected portion of the container, and wherein the protected portion of the container is at a recessed portion of the container.

c. A radio-frequency identification (RFID) assembly coupled to or formed with a label for a container, wherein RFID assembly comprises an antenna for receiving or sending a radio-frequency (RF) signal, the antenna substantially located on or within a main body of the label; a microchip for storing or processing information, a junction between the microchip and the antenna wherein the microchip is in electrical communication with the antenna, wherein the microchip and the junction are at a protected portion of the container, and wherein the protected portion of the container is a pocket on the container.

d. A radio-frequency identification (RFID) assembly coupled to or formed with a label for a container, wherein RFID assembly comprises an antenna for receiving or sending a radio-frequency (RF) signal, the antenna substantially located on or within a main body of the label; a microchip for storing or processing information, a junction between the microchip and the antenna wherein the microchip is in electrical communication with the antenna, wherein the microchip and the junction are at a protected portion of the container, and wherein the protected portion of the container is an overlap potion of the label.

e. A radio-frequency identification (RFID) assembly coupled to or formed with a label for a container having a primary portion and a recessed portion, wherein the RFID assembly comprises an antenna for receiving or sending a radio-frequency (RF) signal, the antenna substantially located on or within a portion of the label adjacent the primary portion of the container; and a microchip for storing or processing information located on or within a portion of the label adjacent a recessed portion of the container, wherein the microchip is in electrical communication with the antenna.

f. An RFID assembly similar to any preceding clause in conjunction with a container having a primary portion and a recessed portion, wherein the antenna is substantially located on or within the main body of the label adjacent the primary portion of the container; and the microchip is located on or within a tab adjacent the recessed portion of the container.

g. An RFID assembly similar to any preceding clause, further comprising a radio-frequency identification (RFID) detail, wherein the RFID detail is a number indicative of the microchip.

h. An RFID assembly similar to any preceding clause, wherein the recessed portion comprises a shoulder and a neck and wherein the tab of the label is adjacent the shoulder, the neck, a portion of the shoulder, or a portion of the neck of the container.

i. An RFID assembly similar to any preceding clause wherein at least one junction provides electrical communication between the microchip and the antenna, and is located on or within the label adjacent the recessed portion of the container.

j. An RFID assembly similar to any preceding clause wherein a width of the antenna is between 30% and 100% of a label length of the label.

k. An RFID assembly similar to any preceding clause wherein the label further comprises a window, and wherein the window is a transparent portion or a cut-out portion of the label used to observe how much material is in the container.

l. An RFID assembly similar to any preceding clause wherein the label includes at least two layers and the microchip is located between the at least two layers.

m. An RFID assembly similar to any preceding clause wherein a label length is greater than the perimeter or circumference of at least a portion of the container to define the overlapping portion, wherein the microchip is located on or within the overlapping portion of the label.

n. An RFID assembly similar to any preceding clause, wherein the overlapping portion of the label includes a first overlapping portion defined by a first protrusion and a second overlapping portion defined by a second protrusion, wherein the microchip is located on or within the first protrusion or the second protrusion.

What is claimed is:

1. A radio-frequency identification (RFID) assembly coupled to or formed with a label for a container, wherein the RFID assembly comprises an antenna for receiving or sending a radio-frequency (RF) signal, the antenna substantially located on or within a first portion of the label; and a microchip for storing or processing information located on or within an overlapping portion that extends from the main body of the label, wherein the microchip is in electrical communication with the antenna; and wherein the overlapping portion of the label includes a first overlapping portion defined by a first portion, protrusion, or tag, and a second overlapping portion defined by a second portion, protrusion, or tag, wherein the microchip is located on or within the first portion, protrusion, or tag or the second portion, protrusion, or tag.

2. The RFID assembly of claim 1 wherein a width of the antenna is between 30% and 100% of a label length of the label.

3. The RFID assembly of claim 1 wherein the label further comprises a window, and wherein the window is a transparent portion or a cut-out portion of the label.

4. The RFID assembly of claim 1 wherein the label includes at least two layers and the microchip is located between the at least two layers.

5. The RFID assembly of claim 1, wherein a label length is greater than the perimeter or circumference of at least a portion of the container, wherein the microchip is located on or within the overlapping portion of the label.

6. The RFID assembly of claim 5, wherein the first overlap portion and the second overlap portion have an overlap length that is between 100% and 1000% of the label length.

7. The RFID assembly of claim 1, wherein the microchip is between the first overlapping portion and the second overlapping portion.

8. The RFID assembly of claim 1, wherein the microchip is beneath the first overlapping portion and the second overlapping portion.

9. The RFID assembly of claim 8, wherein the microchip is between the second overlapping portion and the container.

10. The RFID assembly of claim 1, wherein at least a portion of the microchip is radially adjacent to or in contact with the first overlapping portion and the second overlapping portion.

11. The RFID assembly of claim 1, wherein the microchip is embedded in the first overlapping portion or the second overlapping portion.

12. The RFID assembly of claim 1, wherein the first overlapping portion or the second overlapping portion includes material or an additional layer; and wherein the microchip is surrounded by the material.

13. The RFID assembly of claim 1, wherein the antenna is located in both the first overlapping portion and the second overlapping portion.

14. The RFID assembly of claim 1, wherein the antenna is located entirely on the first overlapping portion or the second overlapping portion.

15. A radio-frequency identification (RFID) assembly coupled to or formed with a label for a container, wherein the RFID assembly comprises an antenna for receiving or sending a radio-frequency (RF) signal, the antenna substantially located on or within a first portion of the label; and a microchip for storing or processing information radially adjacent to or in contact with an overlapping portion that extends from the main body of the label, wherein the microchip is in electrical communication with the antenna; and wherein the overlapping portion of the label includes a first overlapping portion defined by a first portion, protrusion, or tag, and a second overlapping portion defined by a second portion, protrusion, or tag, wherein the microchip is located on or within the first portion, protrusion, or tag or the second portion, protrusion, or tag.

* * * * *